United States Patent [19]
Grosz-Roell et al.

[11] Patent Number: 4,919,541
[45] Date of Patent: Apr. 24, 1990

[54] GAS-LIQUID MASS TRANSFER APPARATUS AND METHOD

[75] Inventors: Friedrick Grosz-Roell, Zurich, Switzerland; Michael Mutsakis, Brooklyn, N.Y.; Robert G. Rader, Wichita, Kans.

[73] Assignee: Sulzer Brothers Limited, Winterthur, Switzerland

[21] Appl. No.: 849,002

[22] Filed: Apr. 7, 1986

[51] Int. Cl.$^5$ .............. B01F 3/04; B01F 5/06; G05D 11/02

[52] U.S. Cl. ............ 366/136; 366/145; 366/152; 366/160; 366/177; 366/337; 165/108; 165/109.1; 138/38; 138/42; 261/76

[58] Field of Search .............. 366/336, 337, 338, 339, 366/340, 136, 137, 101, 145, 152, 160, 177; 165/109.1, 108; 138/37, 38, 40, 42; 261/76

[56] References Cited

U.S. PATENT DOCUMENTS

| | | | |
|---|---|---|---|
| 3,409,274 | 11/1968 | Lawton | 366/340 |
| 3,785,620 | 1/1974 | Huber | 366/340 |
| 4,046,189 | 9/1977 | Clark, Jr. | 165/108 |
| 4,173,178 | 11/1979 | Wieland | 261/76 |
| 4,179,222 | 12/1979 | Strom et al. | 138/38 |
| 4,211,277 | 7/1980 | Grosz-Roll et al. | 366/337 |
| 4,498,786 | 2/1985 | Ruscheweyh | 366/337 |
| 4,689,237 | 8/1987 | Fabre | 261/76 |

FOREIGN PATENT DOCUMENTS

| | | | |
|---|---|---|---|
| 564178 | 10/1958 | Canada | 366/340 |
| 1153965 | 5/1985 | Switzerland | 366/340 |
| 2061746 | 5/1981 | United Kingdom | 366/336 |

Primary Examiner—Philip R. Coe
Assistant Examiner—Joseph S. Machuga
Attorney, Agent, or Firm—Richard P. Crowley

[57] ABSTRACT

A gas-liquid mass transfer apparatus and method, such as for the rapid heating of a liquid stream by a heated gas stream, such as steam, or the rapid dissolving of a gas stream into a liquid stream, which apparatus comprises: a housing having an axial flow path; static or motionless mixing elements disposed in the axial flow path; and passages in the housing to provide for the direct introduction of the gas stream into and about the liquid stream in the axial flow path and substantially along the length of the static mixing elements to provide a mixed product stream.

24 Claims, 1 Drawing Sheet

GAS-LIQUID MASS TRANSFER APPARATUS AND METHOD

BACKGROUND OF THE INVENTION

Commercially available devices used to generate hot water or to heat water miscible liquids generally fall into two categories: indirect heaters and direct heaters.

Indirect heaters accomplish heat transfer by conduction through a metal wall, such as by the direct-fired heating of liquid in a storage tank with open flames or electrical heat coils, or as in heat exchangers wherein liquid is heated by pumping through coils where coils are surrounded by steam or other heating fluid as in typical shell-and-tube heat exchangers.

Direct contact heaters accomplish heat transfer by injecting steam directly into the liquid to be heated, such as by: sparging steam into a tank containing liquid to be heated; mixing tee contact of steam and liquid to be heated; using a venturi steam injector; or by Pick-type heaters. Direct steam injection is recommended for facilities having process steam where small, medium and large volumes of heated process liquid (or hot water) are required, and where accurate temperature control is needed. Indirect heating systems are not efficient in these applications.

The advantages of direct steam injection to heat a liquid include: energy efficiency, i.e. the entire heating value of the steam is used to heat liquid (both latent and sensible heat); provides a continuous supply of heated liquid; provides accurate temperature control; and direct heaters are compact.

Heating a liquid in a vented storage tank by bubbling steam through the liquid has been used for many years because it is a simple and inexpensive way to heat liquids; however, sparging steam into a tank has disadvantages. These disadvantages include: the difficulty to arrive and hold liquid at a set temperature; energy inefficiency, because steam bubbles break to the surface and flash to the atmosphere; and severe water hammer because of large steam bubbles.

Mixing tees, as the name implies, heat a liquid by blending steam with cold liquid flowing in a pipe "tee". This equipment is simple and inexpensive, but is limited to small sizes, less than 2 inches in diameter. In many circumstances, it is impossible to achieve more than an approximate temperature. Large steam-to-liquid volumes produce severe water hammer because of the presence of large steam bubbles resulting from poor mixing.

Venturi injectors heat liquid by injecting steam into cold liquid flowing through a venturi-shaped conduit or constriction in the liquid line. The steam is injected at high velocity at the venturi throat. The low pressure zone created in the downstream expanding section of the venturi generates turbulence and promotes rapid mixing of steam bubbles with cold liquid. Venturi injectors work well when operating close to their design liquid and steam flow rates. With liquid flow rate turndown, the mixing intensity downstream of the venturi throat quickly looses intensity and is not capable of mixing and condensing the steam. Piping hammer also becomes a severe problem. Venturi injectors are not recommended for variable liquid flow rates.

Pick heaters are used in applications demanding small, medium and large volumes of heated liquid and the ability to greatly increase/decrease liquid flow rate at a fixed outlet temperature and/or increase/decrease outlet temperature at a fixed liquid flow rate. Pick heaters exhibit excellent steam turndown (outlet liquid temperature) at design liquid flow rate, and, with an external pump recirculation loop, good liquid turndown at a constant outlet liquid temperature.

The Pick heater consists of a pipe housing with helical grooves protruding inside the pipe, and running along the center axis, a perforated steam injection tube. Steam sparges out of the perforated tube through small holes along the length of the injector tube. The design works well because the steam is introduced into the liquid over a long length through many small holes, and in addition, the steam bubbles and liquid are mixed by the helical grooved wall of the housing.

With decreasing steam requirements, the spring loaded piston in the perforated steam injector tube lowers (controller decreases steam pressure). This sparges the lesser amount of required steam through a smaller number of holes and forces steam out near the front of the helical mixer section. Small steam bubble size is assured by sparging less steam through a smaller number of holes. A major disadvantage of the moving piston design is that piston is prone to sticking due to tight piston/perforated injector tube tolerences. When piston sticks at the low steam flow position, and a high steam rate is called for, high steam velocities can cause extensive damage. Control problems and maintenance downtime results if piston sticks in any position.

While the Pick heater is an effective direct contact heater, it is desirable to provide an improved type direct contact heater and method of heating which requires less maintenance, is of low cost, and can be constructed of a wide variety of materials.

SUMMARY OF THE INVENTION

The invention relates to a gas-liquid direct contact mass transfer apparatus and to a method for the rapid mixing of a gas stream and a liquid stream. In particular, in one embodiment the invention concerns a direct contact steam heater and to a method of heating a liquid stream by direct steam injection. In another embodiment the invention relates to a direct contact apparatus for the mass transfer of a gas stream into a liquid stream at high gas/liquid volume ratios.

The invention comprises a direct contact gas-liquid apparatus and method for the rapid and direct mixing of two fluid streams in a mass transfer operation, or a combination of mass transfer and heat transfer operation, and is particularly useful for high gas-to-liquid volume ratios, for example, greater than 2 to 1.

The direct contact apparatus comprises: a housing, such as a conduit, having an axial flow path; and a conduit inlet and a conduit outlet; means to introduce a first fluid, such as a liquid stream, into the conduit inlet; one or more static or motionless mixing elements disposed in the conduit and in the axial flow path; means to introduce a second fluid, such as a gas stream, peripherally about one or more of the static or motionless mixing elements and preferably substantially the entire length of the mixing elements to provide for direct contact and mixing of the first and second fluids by the mixing elements along the axial flow path, and means to withdraw a mixed first and second fluid stream from the conduit outlet, thereby providing for the mass transfer and/or heat transfer between the first and second fluids. Optionally, the apparatus may include additional mixing means, such as additional non-gas sparged static or motionless mixing elements in between the gas sparged mixing elements in the axial flow path or downstream of the conduit outlet to provide for additional mixing in the axial flow path or continued mixing of the fluid mixed stream from the conduit outlet.

The invention includes a direct contact method for the mixing of a first and second fluid stream, such as a liquid stream and a gas stream, particularly at high gas-liquid volume ratios, which comprises: flowing a first fluid stream, such as a liquid stream, along an axial flow path; continuous subdividing the first fluid stream along the axial flow path, such as by inserting static or motionless mixing elements into the axial flow path; injecting a second fluid stream into the axial flow path, such as generally perpendicular to the flow path through one or more openings on one side, both sides or about the flow path, and along at least a portion or all of the axial flow path being subdivided to provide for the rapid mixing of the first and second fluid streams during the subdividing; and withdrawing a mixed product stream composed of the first and second fluids. Optionally, the method includes additional mixing of the withdrawn fluid product stream, such as by continuing the subdivision of the mixed product stream.

The invention provides for the mixing of the gas stream into the liquid stream preferably by introducing the gas stream so that the gas stream is distributed peripherally about the liquid stream as the liquid stream flows through a defined axial flow path and mixing elements in the flow path, rather than adding all the gas stream in front of the axial flow path. The invention may be used for the direct heating of an aqueous liquid stream, such as water, by steam where the steam mixes with and condenses into the aqueous stream in a heat transfer (heating of stream by steam) and mass transfer (dissolving of steam) operation, i.e. the liquid and gas streams are miscible. The invention may also be used where the liquid and condensed gas streams are immiscible, such as the direct and rapid mixing and heating of a hydrophobic liquid stream, such as oil, with steam.

The invention also comprises an effective gas-liquid mass transfer apparatus for contacting a liquid with a gas for the purpose of mass transfer particularly at high gas-liquid volume ratios. The invention includes the mixing of a gas stream into a liquid stream with or without heat transfer, such as the mixing and dissolving of a water miscible gas stream into an aqueous stream. For example, the aqueous stream may comprise water and the gas stream a water soluble gas, such as an alkaline gas, like ammonia or an acidic gas like carbon dioxide, oxides of sulfur like sulfur dioxide, oxides of nitrogen like nitrous oxide, or acidic halogen gas like hydrogen chloride or a halogen gas like chlorine, or acidic sulfur gas like hydrogen sulfide. In addition, the invention is useful in carrying out direct contact rapid reactions between a liquid and gas stream, such as the reaction, such as the neutralization of acidic or alkaline process or waste streams with an acidic or alkaline gas stream.

The invention also provides for the treating of a liquid stream by oxidation, ozonation, halogenation, hydrogenation, etc., of the liquid stream by use of the appropriate gas stream of air, oxygen, hydrogen, halogens, and other reactive gas components. The absorbed gas stream may or may not react with the liquid stream or components thereof. For example, the liquid stream may comprise a water stream and the gas stream an air or oxygen-containing gas stream for the purpose of increasing the dissolved oxygen (DO) content of the liquid stream, such as the treatment of aqueous water streams. The liquid stream may contain catalysts therein which promote or catalyze the reaction of the liquid and the gas stream, such as the use of a gas stream like hydrogen, carbon dioxide, carbon monoxide, and combinations, to dissolve in a catalyst-containing oil stream for the production of an alcohol like a methanol product stream. The gas and liquid stream may have or comprise inert carrier components or may include concentrated stream. For example, the gas stream may comprise an air stream with low concentration of a dissolving or reacting gaseous component, e.g. air enriched in oxygen. Thus, the mass transfer apparatus and method includes, but is not limited to: mass transfer; heating; dissolving of a gas into a liquid, with or without chemical reaction; or merely the rapid and effective dispersion of gas-liquid or liquid-liquid product stream.

In the operation of the apparatus and method preferably the liquid stream is passed into the housing and the gas stream is injected into one side, both sides or preferably around the mixing element and into the liquid stream. The gas-liquid volume ratio where the fluid streams are to be mixed typically is greater than 2 to 1, but may vary. For example, where steam is the gas stream and water the liquid stream the gas-liquid ratio may be 8 to 12 to 1 or more. Where the gas stream is a dissolving gas, such as sulfur dioxide or ammonia, the gas-liquid volume ratio may be quite high, for example, 20 to 40 to 1 or more.

In one embodiment the invention comprises a direct contact heating method to heat a water miscible liquid, which method comprises: flowing a liquid stream to be heated along a defined axial flow path; inserting in the axial flow path one or more static mixing elements; and flowing a heated gas stream like steam generally peripherally into the axial flow path and along substantially the defined length of the static mixing means to provide for the discharge of a heated water miscible liquid stream by the rapid heating of the liquid stream by the heated gas stream.

In this embodiment the invention also comprises a direct contact heater for the rapid heating of a liquid stream by a heated gas stream, which heater comprises in combination: a housing or conduit having an inlet and an outlet and defining an axial flow path; static mixing elements of defined length inserted in the housing to provide for the mixing of the liquid stream and the heated gas stream; means to introduce a liquid stream into the inlet; a jacket surrounding the housing; means to introduce a heated gas stream, e.g. steam, into the jacket and about the housing; gas stream introduction openings or holes in the housing and externally along substantially the length of the static mixing elements to permit the heated gas stream in the jacket to be introduced and flow generally peripherally about and into the axial flow path and into the liquid stream while static mixing occurs; and means to withdraw from the outlet a heated liquid stream.

In this embodiment the direct contact apparatus and method of the invention comprises using standard static mixing elements for rapidly heating water miscible liquids, such as water or aqueous solutions, continuously in-line, or water immiscible liquids, such as oil, by direct contact with steam.

The direct contact heater heats a liquid stream by sparging steam through small holes on either side and along the length of a static mixing unit instead of simply injecting all steam in front of the first mixing element.

The direct contact apparatus includes static mixing elements inserted in a mixer housing which is equipped with a steam jacket around the mixer housing. A heated fluid, such as steam, is fed to the steam jacket. Many small holes are strategically drilled, typically semi-circular or peripherally, about and through the mixer housing allowing the steam to be finely sparged along the length of the inserted static mixing units and in between or in the middle of each static mixing element layer.

The liquid to be heated follows the tortuous path of the static mixing elements, i.e. is continually subdivided and mixed along the axial flow path, and is contacted with injections of steam along the length of each mixing element and in the middle of or between each layer of the mixing element. Steam may be sparged into one or a plurality of, e.g. 2 to 10, static mixing elements. Optionally but preferably, additional static mixing elements of the same or different design, which are not steam sparged, may be positioned between each sparged static mixing element and/or downstream of the static mixing units wherein steam is sparged to act as a final gas-liquid contactor. For example, the first static mixing elements may comprise three elements, each containing 20 holes, one hole per mixing element layer on each side of the element, and a second row of holes slightly downstream of the first row. Steam, when injected between mixing element layers on either side of the flow path containing the axial flowing liquid, is instantly stretched by opposite flowing mixing element layers or channels. The stretched steam bubbles quickly become a thin film surrounded by the liquid to be heated, and rapidly condense. Undissolved steam bubbles are rapidly dispersed/mixed in downstream mixing elements and condensed.

The static mixing elements to be employed may vary in number, nature and design, but should provide for the rapid and effective static or motionless mixing along a defined axial flow path in a current of the heated fluid, e.g. steam, and the liquid stream, e.g. a condensate stream, to be heated at a low pressure drop.

A wide variety of static or motionless mixing elements or combinations thereof may be employed as the mixing elements. Such mixing elements may include, but not be limited, to: those mixing elements described in U.S. Pats. No. 3,286,992; 3,664,638; 3,785,620; 3,871,624; 3,918,688; 3,923,288; 4,061,313; and 4,034,965, and the mixing elements described in copending U.S. patent application Ser. No. 774,927, filed Sept. 11, 1985, all hereby incorporated by reference. Usually it is desirable to provide two, three, four or more mixing elements in the axial flow path each containing 5, e.g. 5 to 10, layers. Mixing elements as described in the U.S. patent application and commercially sold as SMV ™ mixing elements by Koch Engineering Company, Inc. of Wichita, Kans., a licensee of Sulzer Brothers Ltd. of Winterthur, Switzerland, have been tested and found to be very effective for the rapid steam heating of a water stream. Also, other static mixing elements useful are preferably composed of structured, e.g. corrugated guiding plates, with the plates disposed so that the flow channel layers are inclined with respect to the axis of the housing, whereby the flow channels of neighboring plates cross.

The fluid stream used to heat a liquid stream is usually steam; however, other heated gas or liquid streams may be employed as desired. The liquid stream to be heated may comprise, and typically is, a water miscible liquid stream, such as an aqueous stream, like a condensate or aqueous process stream. The liquid stream may also comprise a water immiscible stream, such as a hydrocarbon or hydrocarbon-containing liquid stream to be heated, for example, an oil stream to be heated with steam. If required, an oil separator unit or process can be employed downstream of the direct contact heater to provide for the removal of the steam condensate. Also, where desired or required, all or a portion of the heated or mixed liquid stream may be recycled back to the direct contact apparatus until the desired temperature is reached, or the mass transfer desired completed. The apparatus may also use automatic controls, such as a temperature monitoring device, in the exit line with a signal feedback control to the steam or gas injection valve of the direct contact heater to provide for accurate temperature or other control of the heated or mixed product liquid stream.

In contrast to the Pick heater, during constant liquid flow operations where varying outlet liquid temperature is required, the Pick heater with spring loaded steam injector tube assures small steam bubbles at steam turndown. Small bubbles, coupled with mixing in the helical flights, assure condensation of steam. However, the direct contact apparatus and heater does not require a spring loaded mechanism to keep steam sparged at high velocities and small bubbles. The steam sparger operates with minimal steam maldistribution down to about 25% of design flow; that is, the same amount of steam exits each hole. At high steam turndown (very low steam flow), the fixed hole steam sparger of the direct contact heater of the invention is allowed to maldistribute and produce larger steam bubbles. The downstream mixing elements will easily disperse the small amount of steam into fine bubbles for rapid, complete dissolution. The Pick heater relies on small steam bubbles followed by fair-good mixing, while the direct contact apparatus described herein relies on excellent static mixing which allows larger steam bubbles as the gas feed stream. It has been found that the direct steam heater of the invention operates well at low steam flow rates in the absence of water hammer.

In direct contact heaters, to generate a smaller quantity of hotter than normal liquid, the steam rate is increased while the liquid rate is decreased. Both the Pick heater and the direct contact heater described provide excellent stream distribution at high steam flow rates. The higher steam-to-liquid volume ratio, however, means downstream mixing is more critical. The heater of the invention provides more intimate contact with the high steam-to-liquid volume ratio than will the Pick helical grooved mixer. The helical grooved mixer tends to spin undissolved steam bubbles and not further disperse them for complete dissolution. The present apparatus performs equal to or better than the Pick heater in providing hotter water before steam breakthrough.

In order to generate a smaller quantity of hot liquid at a fixed temperature, both the direct contact heater and the Pick heater have limitations. However, both heaters have a much wider operating range than any direct contact heater, including mixing tees and venturi injectors. When a decreased quantity of hot liquid at a fixed temperature is desired, the steam as well as cold liquid feed rate is proportionally decreased (fixed steam-to-liquid mass ratio). With lower total flow rate in the same pipe size, the turbulence generated in the downstream mixing chamber rapidly diminished. Below a certain liquid flow rate (20–40% of design flow, depending on diameter), steam will exit the unit undissolved because of poor steam bubble-liquid contact.

In these low liquid flow situations, both the direct contact heater and the Pick units will deliver properly distributed steam to the heating/mixing chamber. However, the mixing is not vigorous enough to fracture the rapidly coalescing steam bubbles and disperse them into the liquid for dissolution. The present heater with the static mixing elements is capable of dispersing steam at lower total velocity than the Pick helical flight mixer; therefore, the inventive heater mixer is capable of providing a lower quantity of water at a fixed temperature than a comparable Pick unit.

For extreme cases of liquid turndown, an external pump can be used to recirculate heated liquid through the heater to prevent stratification of water during low-flow conditions or intermitten use. This system design can be used for both Pick and the present direct contact heaters. The principle of operation is that the external pump is sized to recirculate that minimum amount of liquid necessary to generate hydraulically good steam bubble-liquid mixing in the downstream mixer. A small amount of hot liquid at a constant temperature can then be easily supplied because the combination of the recirculating hot liquid and cool liquid to be heated is above the mixer critical velocity. A smaller recirculating pump is required with the inventive heater because the static mixing elements mix and condense steam at a lower flow rate than the Pick helical mixer.

The described direct contact heater has a number of significant advantages over the Pick heater, in that: no moving parts are required, and hence, no maintenance; the Pick heater's injector tube with very small holes, spring and piston assembly requires periodic maintenance; the inventive heater is less expensive; the Pick heater requires flanges on the large diameter helical flight casing to disassemble unit and replace moving parts; Pick also requires a machined injector tube and piston; the inventive heaters are a smaller overall diameter and require no jacket flanges to dismantle and replace moving parts; in addition, the inventive heaters can be constructed of a wide variety of materials of construction; and the inventive heater uses simple sheet metal for the mixing elements and readily available pipe for the housing. The Pick housing design is best suited for cast construction due to the internal helical flights. The intricate machined parts for the injector tube also require special raw materials and handling. This can easily become expensive and results in long deliveries for exotic materials of construction.

The invention will be described for the purposes of illustration only in connection with certain embodiments; however, it is recognized that various changes, modifications, additions, and improvements may be made by those persons skilled in the art all falling within the spirit and scope of the invention.

DESCRIPTION OF THE EMBODIMENTS

Figure 1:
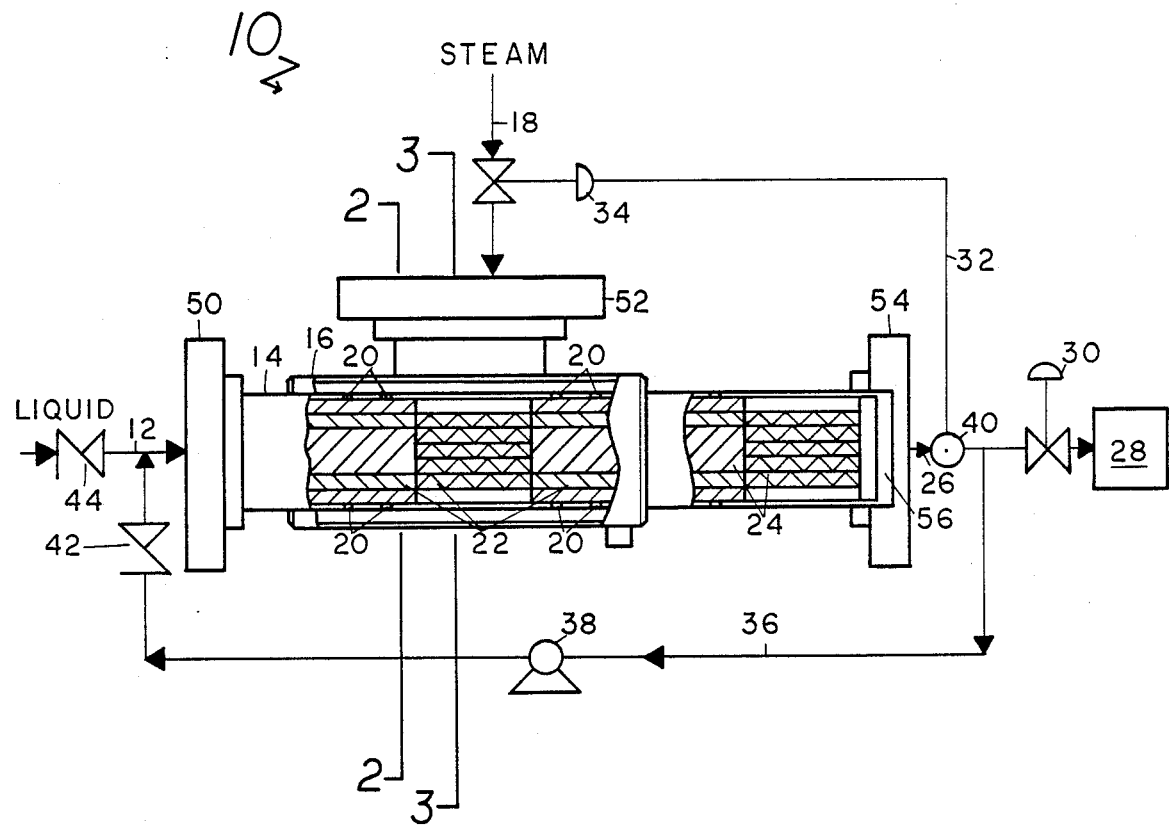
FIG. 1 is a schematic process, partly sectional, illustration of a system employing the mass transfer apparatus of the invention.

FIG. 1 shows a method and system 10 for heating a cold liquid stream, such as an aqueous condensate stream, employing a heat and mass transfer apparatus which comprises: a 3 inch axial conduit housing 14; a cold liquid stream inlet 50; a heated product stream outlet 54; a steam inlet 52; and a steam jacket 16 about and spaced apart from the housing 14. The apparatus also includes three type SMV$^{TM}$ motionless mixing elements 22 (each 3 inches long) within the housing 14. The mixing elements are described more particularly in U.S. Pat. Nos. 3,785,620; 3,871,624; and 3,918,688, and as illustrated have multi-layers (5 shown) defining multiple mixing channels formed of corrugated sheets 48 (see FIGS. 2 and 3), and contact points where adjacent sheets tough 46 shown as straight lines.

As shown, the motionless mixing elements 22 are arranged in the axial flow path of housing 14 with the middle mixing element disposed 90° to the first and third mixing elements. The housing 14 has a plurality of small steam sparging holes 20 (e.g. 13/32 inch) spaced generally uniformly on opposite sides of each mixing element 22 (holes 20 for first and third mixing elements are shown in FIG. 1, but see FIG. 3). Additional steam non-sparged motionless mixing elements 24 are placed downstream to provide for additional post mixing of the heated product stream. Narrow retaining bars 56 are placed at the outlet 54 to retain the mixing elements 22 and 24 in the housing 14.

The system includes: a cold liquid inlet line 12 to inlet 50; a heated liquid product stream outlet line 26 from outlet 54; and a steam inlet line 18 to inlet 52 through a steam control valve 34 and connected by a feedback control signal line 32 to a temperature probe 40 in outlet line 26. In operation, the temperature probe monitors the temperature of the heated liquid product stream and through electrical, pneumatic or hydraulic signals through line 32 to control valve 34 controls the steam introduced into inlet 52. A recirculation line 36 is shown from outlet line 26 through pump 38, check valve 42 into inlet line 12 with inlet check valve 44. The heated liquid product stream, i.e. the water with condensed steam, passes through outlet control valve 30 and is used, for example, in an absorber 28 or other process-type equipment.

Figure 2:
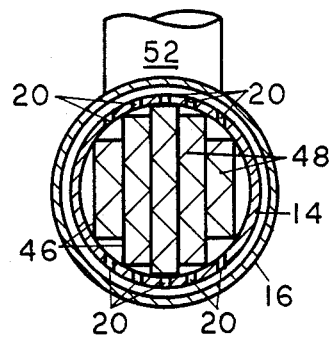
FIG. 2 is a sectional view of FIG. 1 along line 2—2.

FIG. 2 is a sectional view showing the steam inlet 52, the housing 14 and the steam jacket 16 with the 5-layer mixing element 22 having points 46 where the sheets touch and corrugations 48 defining the mixing layer. Sparging holes 20 are on opposite sides of the axial flow path and are aligned so that the steam introduced is split and enters two adjacent mixing layers of the mixing elements 22.

Figure 3:
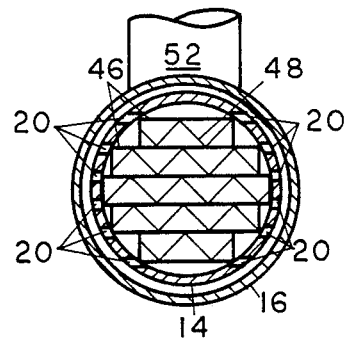
FIG. 3 is a sectional view of FIG. 1 along line 3—3.

FIG. 3, like FIG. 2, is a sectional view, but of the middle mixing element 22, wherein the steam sparging holes 20 are positioned for illustration purposes to introduce steam directly into each mixing layer. As illustrated, the steam sparging holes 20 in housing 14 are placed arcuately and uniformly on opposite sides of each multi-layer mixing element 22 with the holes 20 arranged 90° in the next adjacent mixing element 22 to provide in two adjacent mixing elements peripheral injection of the steam in between or at the middle of the mixing layer.

In FIG. 3 steam or gas is injected between mixing element layers (6 sparging holes per side, 2 rows of holes per element, 24 drilled holes per total element), while in FIG. 2 steam or gas is injected on the edge of each layer sheet (5 sparging holes per side, 2 rows of holes per element, 20 drilled holes per total element, for 5-layer mixing element). Injecting steam on the edge of each element layer cuts the steam into two parts and requires a lesser number of sparging holes 20 to be drilled per side, per row, per mixing element. While circular sparging holes are illustrated, any form or shape of opening for the injection of the gas or steam may be used, including, but not limited to, openings such as slots, and rectangular and oval openings.

In operation steam is injected through inlet 52 into the space between the housing 14 and jacket 16 and through holes 20 into the cold liquid stream introduced in inlet 50 and throughout the motionless mixing elements 22 to provide for rapid mass transfer and heating of the liquid stream by the steam. Multiple mixing elements 24 downstream provide additional mixing of the heated stream which is withdrawn through outlet 54. The temperature of the heated stream is controlled as shown. If desired, the probe 40 may comprise one or more probes to monitor a condition of the product stream, such as a pH, viscosity or dissolved oxygen, (DO) probe, and which adjusts the flow of the injected gas stream as required to obtain a product stream of defined properties.

The gas-liquid direct contact apparatus provides for the rapid mixing of a liquid stream with a gas stream without the need of maintenance of many parts, and in a low cost, compact and effective design and manner.

What is claimed is:

1. A direct contact gas-liquid mass transfer apparatus, which apparatus comprises:
   (a) a housing;
   (b) a conduit within said housing which conduit defines an axial flow path for a liquid stream, the conduit having an inlet, an outlet and a plurality of peripherally spaced openings positioned generally perpendicular to and along the length of the axial flow path;
   (c) motionless mixing means composed of one or more mixing elements in the said axial flow path;
   (d) means to introduce a liquid stream into the inlet;
   (e) means to introduce the gas stream through the plurality of openings and into and generally peripherally about the motionless mixing means and along substantially the length of the motionless mixing means and radially into the axial flow path containing the liquid stream for a rapid mixing of the gas and liquid streams to provide a mixed liquid product stream, the gas stream introduced at a gas-liquid volume ratio of about 2 to 1 or greater; and
   (f) means to withdraw a mixed liquid product stream from the outlet.

2. The apparatus of claim 1 wherein the plurality of openings are positioned along the entire length of the axial flow path.

3. The apparatus of claim 1 wherein the motionless mixing means comprises a plurality of axially aligned motionless mixing elements, each element comprised of a plurality of flow channel mixing layers.

4. The apparatus of claim 1 which includes additional motionless mixing means downstream of the outlet to provide for additional mixing of the mixed product stream after discharge from the outlet.

5. The apparatus of claim 1 which includes:
   (a) a valve means to control the introduction of the gas stream;
   (b) a probe means to provide a signal based on a condition or property of the mixed product stream; and
   (c) a feedback means to control the valve means in relation to the signal from the probe means.

6. The apparatus of claim 1 which includes means to recirculate the mixed product stream to the inlet of the direct contact apparatus.

7. The apparatus of claim 1 wherein the motionless mixing means includes a plurality of axially aligned mixing elements composed of a plurality of flow channel mixing layers; and wherein the means to introduce the gas stream introduces the gas stream between or in the middle of each layer.

8. The apparatus of claim 1 wherein the motionless mixing means comprises:
   (a) a first motionless mixing element;
   (b) a second motionless mixing element adjacent and downstream of the first mixing element;
   (c) a third motionless mixing element adjacent and downstream of the second mixing element; and
   (d) wherein the openings are located adjacent the first and third motionless mixing elements.

9. The apparatus of claim 1 wherein the motionless mixing means comprises a plurality of mixing elements, the elements sequentially arranged about 90° relative to adjacent mixing elements for opposite flow of the liquid stream along the axial path.

10. A direct contact method for the rapid mixing of a liquid and gas stream in a conduit having a motionless mixer, which method comprises:
    (a) flowing a liquid stream along a defined axial flow path in a conduit;
    (b) introducing a gas stream into the liquid stream at a gas-liquid volume ratio of greater than 2 to 1 generally perpendicularly and peripherally about the axial flow path of the liquid and the motionless mixer in the conduit; and
    (c) continuously subdividing the gas and liquid steam in the conduit and along the axial flow path by said motionless mixer to provide for the rapid mixing of said gas and liquid streams in the axial flow path; and
    (d) withdrawing from the axial flow path a mixed product stream.

11. The method of claim 10 wherein the gas stream is gas which dissolves into the liquid stream.

12. The method of claim 10 wherein the liquid stream is an aqueous stream, and the gas stream is steam, and which includes a gas-liquid volume ratio of greater than about 8 to 1.

13. The method of claim 10 which further includes passing the product stream through a second motionless mixer to provide additional and continued mixing of the product stream.

14. The method of claim 10 wherein said motionless mixer includes a plurality of motionless mixing elements composed of a plurality of mixing layers and introducing the gas stream into each of the said mixing layers from opposite sides of the axial flow path.

15. The method of claim 10 wherein the liquid stream comprises an aqueous stream and the gas stream comprises a water miscible gas stream.

16. The method of claim 10 wherein the gas stream comprises halogen gas, hydrogen chloride, oxides of sulfur, ammonia, oxygen, air, hydrogen sulfide, carbon monoxide, carbon dioxide, oxides of nitrogen, steam and combinations thereof.

17. The method of claim 10 which includes injecting the gas stream through a plurality of openings generally uniformly spaced about the periphery and substantially the length of the axial flow path.

18. A method of heating a liquid stream, which method comprises:
   (a) flowing an water miscible liquid stream to be heated along a defined axial flow path in a conduit;
   (b) inserting in the axial flow path one or more motionless mixing means of a defined length to provide for the motionless mixing of a gas and liquid streams, the said liquid stream flowing axially through the said motionless mixing means;
   (c) flowing a gas stream of steam generally into and peripherally about the axial flow path along substantially the defined length of the motionless mixing means on the axial flow path to provide for the rapid mixing and heating of the water miscible liquid stream with the steam, the steam-liquid volume ratio having a ratio of 8 to 1 or greater; and
   (d) withdrawing from the axial flow path a heated liquid product stream.

19. The method of claim 18 which includes injecting the steam gas stream through a plurality of openings spaced about the periphery of the axial flow path and into the motionless mixing means.

20. The method of claim 18 which further including a second motionless mixing means downstream of the axial flow path to provide further continued intimate mixing of the withdrawn heated product stream.

21. The method of claim 18 wherein the motionless mixing means comprises a plurality of mixing elements in the axial flow path, the mixing elements sequentially arranged about 90° relative to the adjacent mixing elements to provide for opposite flow of the liquid stream passing along the axial flow path and each element having a plurality of layers.

22. The method of claim 21 which includes flowing the steam stream through a plurality of peripherally spaced openings along the axial flow path, with at least about one opening for each layer for each mixing element.

23. The method of claim 18 wherein the motionless mixing means comprises a plurality of at least a first, second and third axially aligned mixing elements, and wherein the steam stream is introduced into the first and third mixing elements.

24. The method of claim 18 which includes recycling some or all of the product stream in the axial flow path which contains the motionless mixing means.

* * * * *